USOO8009590B2

(12) United States Patent
Straub et al.

(10) Patent No.: US 8,009,590 B2
(45) Date of Patent: Aug. 30, 2011

(54) METHOD FOR LINKING SEVERAL COMMUNICATION BUSSES USING WIRELESS LINKS

(75) Inventors: Gilles Straub, Grébusson (FR);
Sébastien Perrot, Rennes (FR);
Caroline Landry, Cesson Sévigné (FR);
Christophe Vincent, Gahard (FR);
Helmut Burklin, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 1388 days.

(21) Appl. No.: 10/399,606

(22) PCT Filed: Oct. 18, 2001

(86) PCT No.: PCT/EP01/12335
§ 371 (c)(1),
(2), (4) Date: Oct. 6, 2003

(87) PCT Pub. No.: WO02/37765
PCT Pub. Date: May 10, 2002

(65) Prior Publication Data
US 2004/0057411 A1 Mar. 25, 2004

(30) Foreign Application Priority Data

Oct. 19, 2000 (EP) .................................... 00402901
Oct. 19, 2000 (EP) .................................... 00402908
Mar. 30, 2001 (EP) .................................... 01400826
Jun. 19, 2001 (EP) .................................... 01114694

(51) Int. Cl.
*H04L 12/28* (2006.01)
(52) U.S. Cl. ........................................ 370/255; 370/257
(58) Field of Classification Search .................. 370/257, 370/329, 330, 345, 350, 466, 401, 252, 85; 455/450; 709/250, 229, 223; 445/556; 710/16
See application file for complete search history.

(56) References Cited

U.S. PATENT DOCUMENTS 6,128,318 A * 10/2000 Sato ............................... 370/503
6,298,405 B1 * 10/2001 Ito et al. ......................... 710/107
(Continued)

FOREIGN PATENT DOCUMENTS
FR 2786355 5/2000
(Continued)

OTHER PUBLICATIONS

David V. James: "Hiperlan-2 wireless informative annex as submitted to the p1394.1 committee," IEEE, P1394.1 Draft Standard for High Performance Serial Bus Bridges, IEEE, New York, NY, US, Oct. 12, 1999 pp. 1-12.

*Primary Examiner* — Kwang B Yao
*Assistant Examiner* — Syed M Bokhari
(74) *Attorney, Agent, or Firm* — Robert D. Shedd; Paul P. Kiel

(57) ABSTRACT

Method for linking a first and a second communication bus through a wireless link, comprising a first portal connected to the first bus and a second portal connected to the second bus, said first and second portal communicating over a wireless connection. The method comprises the steps of:
associating the two portals to the wireless network;
exchanging, between the two portals of self identification packets of nodes connected to their respective local busses, including the self identification packets of the portals themselves;
generating a reset on each bus;
carrying out a self identification procedure on each bus, where each portal generates self identification packets for itself and for nodes of the respective remote bus, using the self identification packets received following the association step.

23 Claims, 11 Drawing Sheets

U.S. PATENT DOCUMENTS

| | | |
|---|---|---|
| 6,446,142 B1 * | 9/2002 | Shima et al. .................... 710/16 |
| 6,658,475 B1 * | 12/2003 | Ueno ........................... 709/229 |
| 6,694,139 B1 * | 2/2004 | Sugaya et al. ................ 455/450 |
| 6,694,363 B1 * | 2/2004 | Yamadaji et al. ............. 709/223 |
| 6,885,643 B1 * | 4/2005 | Teramoto et al. ............. 370/252 |
| 6,954,467 B1 * | 10/2005 | Hillier et al. .................. 370/466 |
| 7,002,928 B1 * | 2/2006 | Smyers ........................ 370/257 |
| 7,200,683 B1 * | 4/2007 | Wang et al. ................... 709/250 |
| 2003/0043771 A1 * | 3/2003 | Mizutani et al. ............. 370/338 |
| 2003/0134590 A1 * | 7/2003 | Suda et al. ................... 455/3.06 |
| 2007/0121656 A1 * | 5/2007 | Heidari-Bateni et al. .... 370/402 |

FOREIGN PATENT DOCUMENTS

| | | |
|---|---|---|
| WO | 99/35587 | 7/1999 |
| WO | 99/55028 | 10/1999 |
| WO | WO 9955208 | 10/1999 |
| WO | 99/65204 | 12/1999 |
| WO | 01/56226 | 8/2001 |

* cited by examiner

METHOD FOR LINKING SEVERAL COMMUNICATION BUSSES USING WIRELESS LINKS

This application claims the benefit, under 35 U.S.C. §365 of International Application PCT/EP01/12335, filed Oct. 18, 2001, which was published in accordance with PCT Article 21(2) on May 10, 2002 in English and which claims the benefit of European patent application No. 00402901.3, filed Oct. 19, 2000; European patent application No. 00402908.8, filed Oct. 19, 2000; European patent application No. 01400826.2, filed Mar. 30, 2001; and European patent application No. 01114694.1, filed Jun. 19, 2001.

The invention concerns a method for linking several communication busses using wireless links in such a way that the network thus formed emulates a single bus.

There is currently an effort to define standards for linking communication busses using wireless technology. Two such efforts are being carried out under the patronage of IEEE on one hand (IEEE P1394.1 "Draft Standard for High Performance Serial Bus Bridges"), and of ETSI on the other hand (Broadband Radio Access Networks (BRAN) HIPERLAN Type 2 Technical Specification; Packet based Convergence Layer, Part 4: IEEE 1394 Bridge Specific Functions sub-layer).

Bridges linking two communication busses or networks have the disadvantage that devices from one bus or network wishing to access devices from the other bus or network need to be bridge aware, i.e. they comprise specific software which will interface with the bridge.

It may be interesting to be able to link two busses or networks using a wireless link in such a way that this link is transparent for connected devices, i.e. that a device on bus accesses another device on the other bus as if both were connected to the same bus.

The European patent application EP 00402901.3 filed on Oct. 19, 2000 in the name of THOMSON multimedia concerns a network comprising a cluster of devices linked to a wired bus, this cluster being linked through a wireless link to a remote device.

An object of the invention is a method for linking a first and a second communication bus through a wireless link, comprising a first portal connected to the first bus and a second portal connected to the second bus, said first and second portals communicating over a wireless connection, said method comprising the steps of:

associating the two portals to the wireless network;
exchanging, between the two portals, self identification packets of nodes connected to their respective local busses, including the self identification packets of the portals themselves;
generating a reset on each bus;
carrying out a self identification procedure on each bus, where each portal generates self identification packets for itself and for nodes of the respective remote bus, using the self identification packets received following the association step.

The portals linked to each communication bus (cluster) emulate the nodes on their respective cluster for the other communication bus. Nodes linked to a cluster will have visibility of the nodes on the other cluster, in addition to the portal. For this purpose, the portals generate self identification packets for the emulated nodes, in addition to their own self identification packets.

Other characteristics and advantages of the invention will appear through the description of a particular, non-limiting embodiment of the invention, explained with the help of the enclosed figures among which:

The present embodiment concerns a network formed of a plurality of IEEE 1394 wired busses. More information concerning these busses as such can be found in the following documents:

(a) IEEE Std 1394-1995 'Standard for a High Performance Serial Bus (b) IEEE Std 1394a-2000 'Standard for a High Performance Serial Bus—Amendment 1'

(c) IEC 61883-1 (1998-02) Consumer audio/video equipment—Digital interface—Part 1: General Document (c) defines in particular the creation of isochronous connections.

(d) IEEE P1212 'Draft Standard for Control and Status Registers (CSR) Architecture for microcomputer busses'.

According to the present embodiment, the wireless links used to link wired busses are based on the ETSI BRAN Hiperlan 2 draft standard, and in particular on document (e) 'Broadband Radio Access Networks (BRAN); HIPERLAN Type 2; Packet based convergence layer; Part 3: IEEE 1394 Service Specific Convergence Sublayer (SSCS), version 0.g of June 2000. This document addresses the transport of IEEE 1394 traffic between Hiperlan 2 devices.

Of course, the invention is not limited to the particular technologies chosen for the wired bus or the wireless link.

Bridges between two IEEE 1394 busses are currently being standardized by IEEE. The corresponding draft standard is:

(f) IEEE P1394.1 "Draft Standard for High Performance Serial Bus Bridges" Draft 0.14, Dec. 21, 2000.

ETSI is also working on the standardization of an IEEE 1394 Bridge Specific Functions sublayer:

(g) Broadband Radio Access Networks (BRAN) HIPERLAN Type 2 Technical Specification; Packet based Convergence Layer, Part 4: IEEE 1394 Bridge Specific Functions sub-layer, version 0.g (February 2001).

Figure 1:
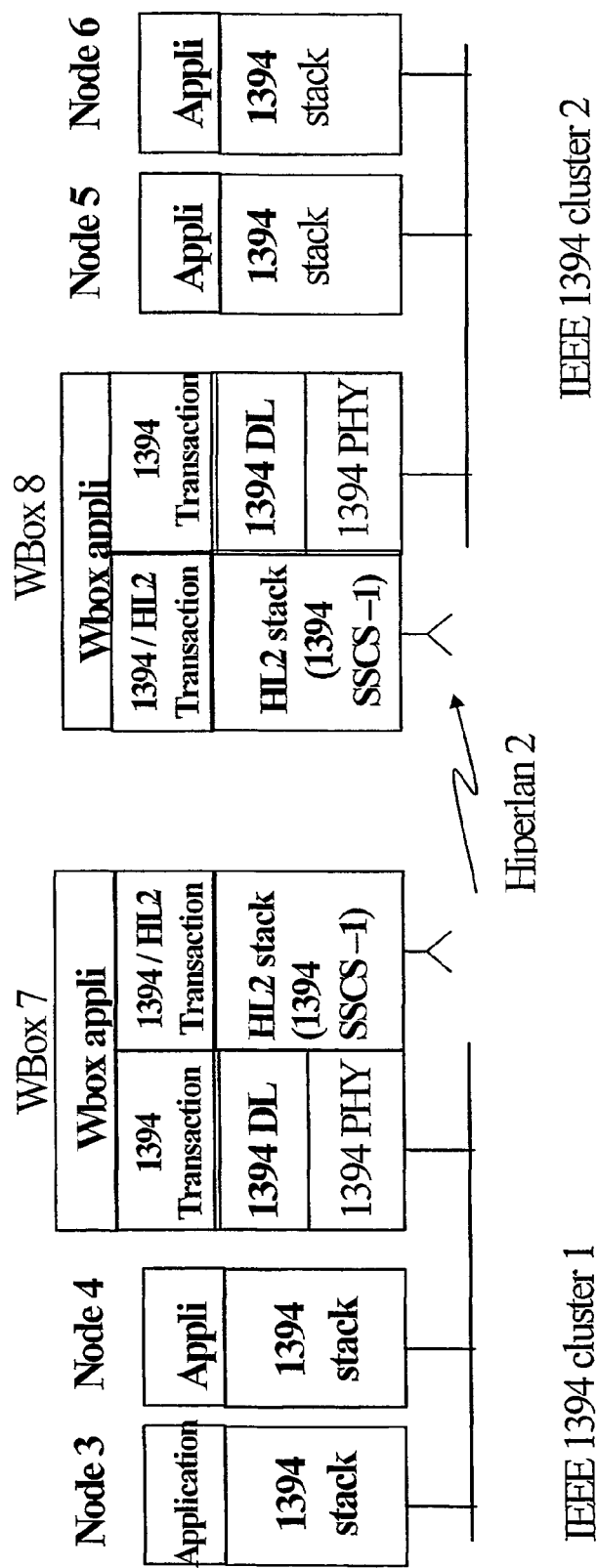
FIG. 1 is a diagram of a network composed of two wired buses linked through a wireless link, each bus constituting a cluster of a plurality of nodes, showing the software stacks in the different devices according to the present embodiment.

FIG. 1 represents a network formed of two IEEE 1394 device clusters 1 and 2, each comprising a wired IEEE 1394 bus, a plurality of devices (respectively nodes 3, 4 and 5, 6) and a portal (for each bus, respectively 7 and 8) to the wireless Hiperlan 2 link these portals being referred to as 'wireless boxes' or simply 'Wboxes'). The nodes are pure IEEE 1394 devices. They are not aware whether they communicate with nodes on their cluster or on the remote cluster, through the wireless link. As far as the nodes are concerned, all nodes seem to be on the same cluster. The nodes need not be aware of the wireless point to point link existing between the two clusters. The transparency of the wireless link, as far as the IEEE 1394 nodes are concerned, is made possible by the wireless boxes 7 and 8.

According to the present embodiment, the wireless boxes 7 and 8 are not transparent to the other devices, in the sense that they are also considered to be devices on their respective busses, i.e. they are attributed a physical identifier after a bus reset.

Each node comprises an IEEE 1394 software stack, i.e. the physical layer, the link layer and the transaction layer, as well as an application layer. Each wireless box also comprises these layers on their wired bus interface, with the differences which will be explained below. Lastly, WBox1 and WBox2 communicate using the Hiperlan 2 protocol stack as defined in the document ETSI BRAN IEEE 1394 SSCS document (document(e)) mentioned earlier.

According to the IEEE1394 standard (document (a)), a unified transaction consists in a request from one device and a response from a receiver device, in which the response is contained in the acknowledgment of the receiver device. Whether a transaction is unified or not (i.e. 'split') can be determined by the receiving node, depending on its capability to respond quickly to the request of the sending node. When a transaction is to be split, the responding node transmits an acknowledgment of receipt which informs the sending node that the transaction is 'pending', and that the response will be sent later on. The sending node waits for a predetermined maximum amount of time ('split timeout'), and abandons the request if no response has been received.

According to the present embodiment, the number of wireless links between any two nodes of the network is limited to a maximum number, in the present case to two. This maximum number of links is chosen in such a way that the split timeout delay of a sending device will normally suffice to cover the combined delays of the wireless links to be crossed, since each wireless link introduces an additional transmission delay between two nodes. The networks which will be described in relation with the figures respect this constraint: each network will comprise a maximum of one branch bus. A branch bus is defined as a bus linked to at least two other busses through respective wireless links. These other busses are then necessarily leaf busses, which are defined as being connected to a maximum of one other bus through a wireless link.

According to the present embodiment, the total number of devices in the network is limited by the maximum number of devices allowed by a single bus, since the goal is to have the network behave as a single bus, as far as the nodes other than the wireless boxes are concerned. In the case of the IEEE 1394, this number is equal to 64. This includes the wireless boxes, which are considered as nodes according to the present embodiment.

Figure 2:
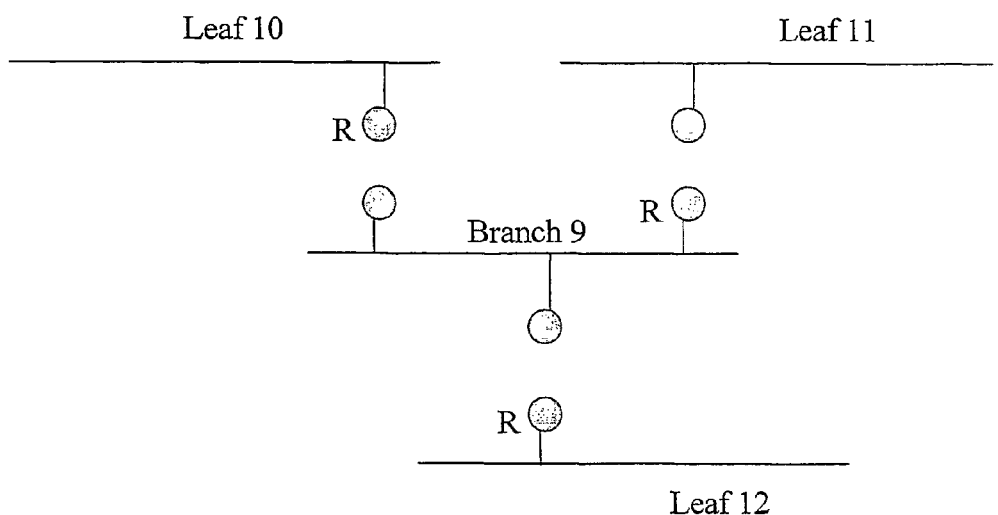
FIG. 2 is a diagram of another network comprising wireless links and illustrating the bus type determination procedure and the root selection procedure on each bus.

An example of a network is given by FIG. 2. A branch bus (or cluster) 9 is connected to three leaf busses (or clusters) 10, 11 and 12 through wireless connections respectively formed by pairs of wireless boxes. Wireless boxes which are root on their bus (or cluster) in the sense of document (a) are marked by an 'R'. How roots are chosen will be explained in relation with the association process of a wireless box to an already existing network.

First, the behavior of a wireless box after connection to a bus will be described. This is followed by the association procedure of peer wireless boxes connected to two distinct busses, and the consecutive linking of the busses. Then, the behavior of the wireless boxes of an already formed network during a network reset will be described, and in particular the process used to propagate the reset from one bus to another. The reservation of isochronous resources on a formed network will then be described. Lastly, the behavior of the wireless devices for broadcast-out and broadcast-in connections will be described.

I] Connection of a Wireless Box to a Bus

According to the present embodiment, each wireless box implements a register called 'BUS_TYPE' register. This register conforms to document (d). In particular, it is located at a known offset in each wireless boxes' directory.

The register is used to store information regarding the type of the bus the wireless box is connected to (blank, leaf or branch) and regarding the existence of a branch bus in the network.

TABLE 1

| indicates the contents of the 'BUS_TYPE' register. |  |
| --- | --- |
| bus_type | branch_existence |
| 2 | 2 |

Table 2 gives the values of the 'bus_type' field in the 'BUS_TYPE' register.

TABLE 2

| Value | Comments |
| --- | --- |
| $00_b$ | Blank bus |
| $01_b$ | Leaf bus |
| $10_b$ | Branch bus |
| $11_b$ | Reserved |

Table 3 gives the values of the 'branch_existence' field in the 'BUS_TYPE' register.

TABLE 3

| Value | Comments |
| --- | --- |
| $00_b$ | Branch bus doesn't exist |
| $01_b$ | Branch bus exists |
| $10_b$ | Reserved |
| $11_b$ | Reserved |

In addition to the definitions given above for a leaf bus and a branch bus, a blank bus is defined as being a bus which is not linked to another bus through a wireless link. Of course, such a bus may comprise a wireless box, but this wireless box has not yet associated with a peer box on another bus. In what follows, a wireless box is said to be associated when it has performed its Hiperlan 2 Radio Link Control association. Two busses are considered to be linked through two associated peer wireless boxes when these two boxes have checked that this link would result in an authorized network topology and configured themselves and their respective local busses accordingly.

When a wired bus is reset, which happens in particular when a wireless box or another node is connected to—or removed from—the bus, the first task carried out by each wireless box on the bus is bus identification. This task consists for each wireless box in determining whether the bus is a blank bus, a leaf bus or a branch bus, given the modified topology. At this stage, a wireless box newly connected to a wired bus is not associated with any peer wireless box.

Each node receives the identifiers of other nodes during the IEEE 1394 self-identification process, which enables each node to send a so-called 'self_id packet' containing, among other information, the physical identifier of the node.

As will be seen later, according to the present embodiment, wireless boxes generate self_id packets for themselves, as well as for remote nodes—if any—on the side of their peer wireless box in case a link has been established with another bus. The information concerning remote nodes is known from previous resets.

Once a wireless box has received all self_id packets, including those from remote clusters sent per proxy by wireless boxes part of an active link, the wireless box reconstructs the topology of the network using an appropriate method. Such a method is described for example in a patent application filed by THOMSON multimedia with the French patent office on May 26, 1998 under the filing number 9806624 and having the publication number FR2779301. This method, or that described in Annex E.3.4. 'Topology construction' of document (a) also enables wireless boxes to determine the topology of the network on the side of their peer wireless boxes. This information is used to properly propagate self_id packets. Topology information comprises the list of devices on a bus or network, and a description of the way these devices are connected.

According to the invention, once the topology map of the network has been obtained, the wireless box checks which nodes are wireless nodes, by verifying which nodes contain the bus type register, and which do not. An active wireless link is recognized when two wireless boxes appear consecutively in the topology map.

The newly connected wireless box then updates its own BUS_TYPE register contents as follows:

1. When a wireless box discovers that there is no other wireless box on the bus which links the local bus to a remote bus, then the local bus is a blank bus. The wireless box sets the bus_type field of the BUS_TYPE register to the value corresponding to blank.

2. When a wireless box detects a single wireless box on the bus which links the local bus to a remote bus (i.e. there is an active link), then the bus is a leaf bus. The wireless box copies the content of the 'branch_existence' field of the other wireless box part of a link into the corresponding field of its own BUS_TYPE register and sets the 'bus_type' field to leaf. According to a variant embodiment, the wireless box determines whether a branch exists through an analysis of the network topology, instead of reading the 'branch existence' field of another wireless box.

3. When a wireless box detects the existence of two or more associated wireless boxes linking the local bus to remote busses, then the local bus is a branch bus. The wireless box updates its 'branch-existence' with the value corresponding to branch and sets the bus_type field to branch.

Wireless boxes which were present on the bus before the bus reset can distinguish between newly connected or removed nodes and nodes which were already present before the reset, by comparing the topology maps before and after the reset.

When a wireless box has been added, the bus type is not changed until it has associated with its peer wireless box and bus linking has taken place. If a wireless box detects that another wireless box has been removed, then it updates its bus_type field following the bus reset and its topology map analysis.

II] Association of Two Wireless Boxes and Linking of Two Busses

Figure 3:
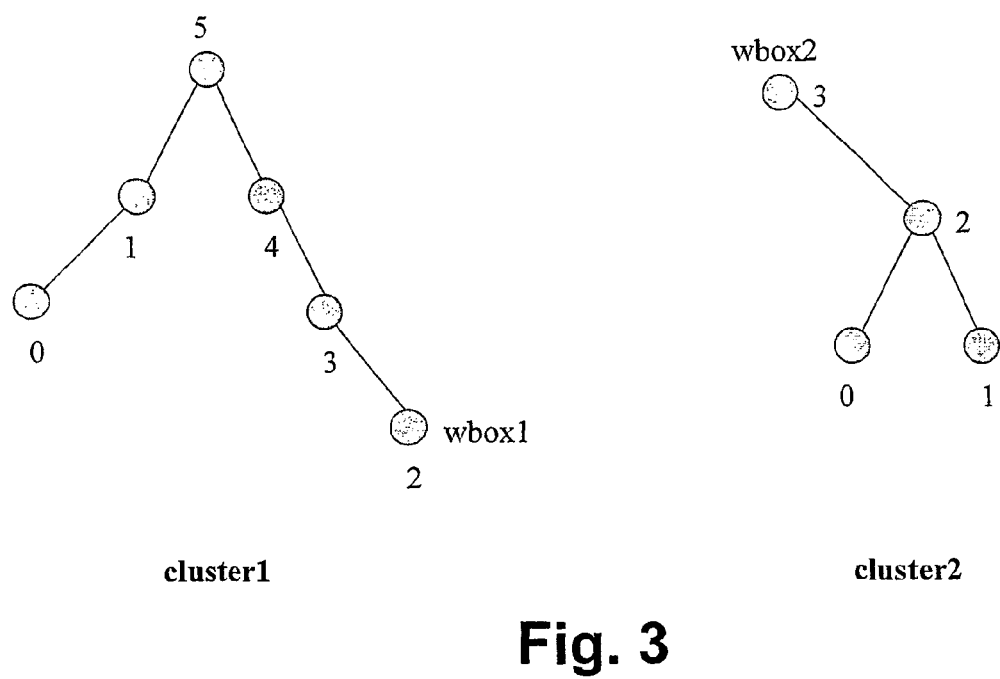
FIG. 3 is a diagram of the physical identifiers ('Physical_id') on two busses before carrying out the bus association procedure of the present embodiment.

FIG. 3 illustrates two clusters before association. 'Cluster 1' comprises a wireless box called 'wbox 1' and five other nodes. 'Cluster 2' comprises the peer wireless box called 'wbox 2' and three other nodes. The numbers indicated near the nodes are the physical identifiers attributed during the previous bus resets. Both busses are blank busses before the association of the wireless boxes and linking of the busses. The node with the physical identifier '5' of cluster 1 is root on its bus, since it has the highest physical id number.

Peer Wireless Box Detection and Hiperlan Association

Once a wireless box has been connected to a bus and once the bus reset has been carried out, it will try to associate with a peer wireless box. According to the present embodiment, a wireless box knows in advance an identifier of its peer with which it is to form a link. In this case, the wireless boxes know the unique 'EUI-64' identifier of their peer.

As a first step, the wireless box reads the EUI-64 identifiers of the other devices on its bus in order to verify whether its peer is also connected to the same bus. In this case, no association is possible in order to avoid reset loops. A corresponding message may be sent to the user, and the association procedure is aborted. As soon as a wireless box detects that its peer has been removed from the bus, it will try to associate again.

According to a variant embodiment, in case more than one branch bus is present on the bus, the wireless box reads the EUI-64 identifiers of devices not only on its bus, but on all busses on its side of the network.

As a second step, the two wireless boxes associate according to the Hiperlan 2 Radio Link Control layer.

Root Selection

The next step is to determine if one or both wireless boxes of an associated pair are to be the root on their respective busses. At least one wireless box of an associated pair should be root (in the sense of document (a)) on its bus, so that the reset message transmission among busses can be properly carried out. There cannot be more than one root per bus.

Figure 4:
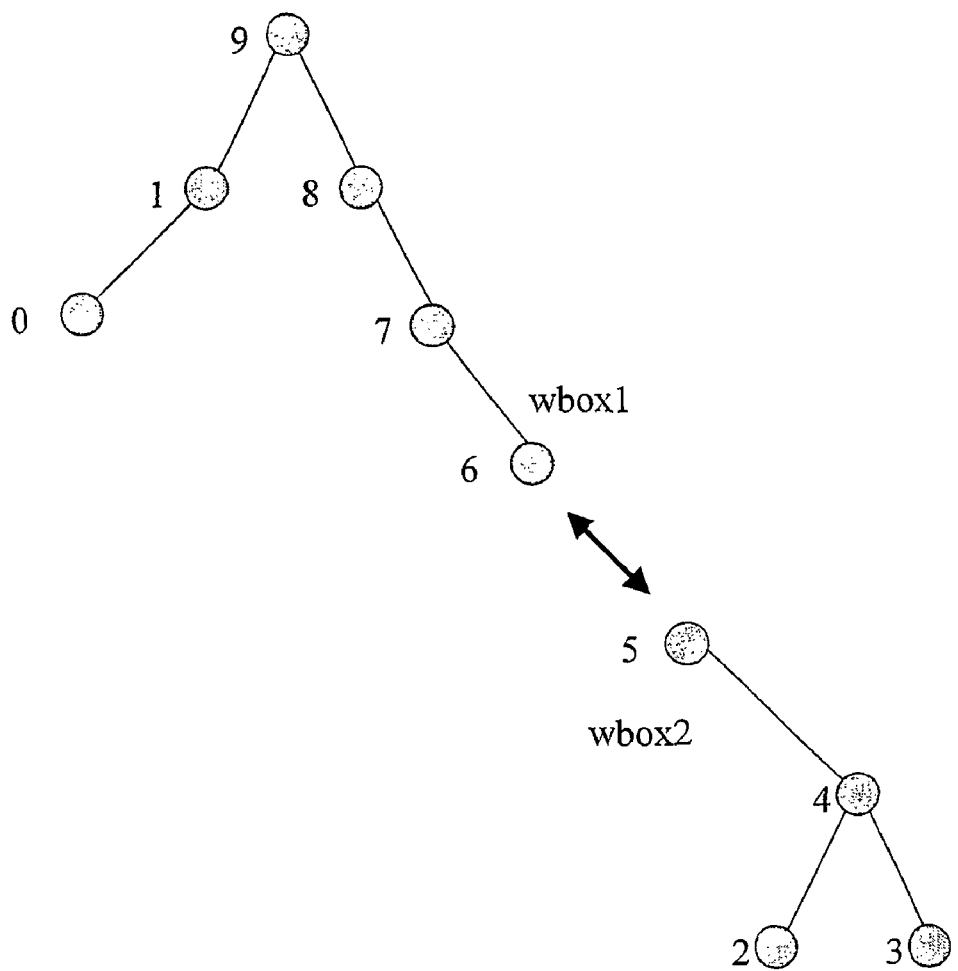
FIG. 4 represents the physical identifiers of the busses of FIG. 3 after bus association.

It is assumed in the case of FIGS. 3 and 4 that 'wbox2' is a root. The 'wbox1' can be a root, but does not have to be. If both wireless boxes are root on their respective busses, then one of the pair is selected to be the dominant root ('global root'). This root would be 'wbox1', not 'wbox2'.

When a third bus is to be linked to a network comprising already two buses (i.e. a branch bus will exist in the final network) then at least one of the wireless boxes linking the third bus to the network should be a root. The branch bus will necessarily be the bus to which the third bus will be linked.

The following rules are applied:

If a wireless box on the branch bus is already a root, the wireless box of the branch bus should not try to become root.

If the branch bus does not contain any wireless box which is root, then the wireless box of the third bus shall try to become root. Its peer wireless box on the branch bus should also try to become root, to maximize the probability that at least one of the two wireless boxes becomes root.

A wireless box may become root by using the 'Force Root Flag' described at section 4.1.1.1 'Set Force Root' of the IEEE 1394 standard (document (a)).

Bus Linkage

The two wireless boxes determine whether linking their busses will result in a valid network topology or not.

The following three conditions are checked:

At least one of the wireless boxes should be root on its bus.

At least one of the wireless boxes should be on a blank bus. Else, the resulting network would comprise more than one branch bus, which is not authorized if the topology limitations relating to the number of wireless links between any two nodes are to be respected.

If a wireless box is on a leaf bus, the branch_existence field of this wireless box should indicate that there is not yet any branch bus in the network (binary value '00').

Of course, for other topology constraints than those of the present embodiment, these conditions may need to be modified and/or supplemented, in particular the second and third conditions.

If these conditions are fulfilled, the busses can be linked. The blank bus becomes a leaf bus and the BUS_TYPE register of the corresponding wireless box is updated accordingly. The former leaf bus to which the new bus is linked becomes a branch bus, and the BUS_TYPE register is also updated.

If these conditions are not fulfilled, the wireless boxes remain associated in the sense of Hiperlan 2, but do not update their BUS_TYPE registers. After each bus reset, the wireless boxes shall restart root selection and try to link their respective busses again, since a reset may be indicative of a change of the network topology.

Once the busses have been linked, each wireless box sends a bus reset message to its peer wireless box. This message contains the complete self_id packets of the respective local bus (e.g. wbox1 of FIG. 3 sends the self_id packets of the five nodes on cluster 1 as well as its own packet and wbox2 sends the three self_d packets of the three nodes of cluster 2 as well as its own self_id packet) and of any busses linked with the local bus.

Each wireless box then proceeds with generating a reset on its local bus. During the self identification process, each portal sends, in addition to its own self_id packets, the self_id packets received from its peer wireless box, when it is given the occasion to do so by the root node of its local bus. The sending of the self_id packets on each cluster takes into account the rules defined by document (a) at section E.3.3., i.e. bus grant for sending a self_id packet is given to a node's children from the left-most (lowest number) port to the right-most (highest number) port.

As already mentioned, wbox2 is considered to be the root node of cluster 2. It thus has control over when to send self_id packets for the cluster 1 nodes and when to give the possibility to one of the nodes of cluster 2 to send its own self_id packet. Wbox2 receives six self_id packets from wbox 1, and from this information deduces the topology map of cluster 1, i.e. the connections of nodes to other nodes' ports on cluster 1. Wbox2 thus knows when it would be granted its turn to send a self_id packet by the root node of cluster 1 if wbox2 were considered as directly connected as the left-most child of wbox1. Wbox2 thus knows that it should send first on cluster 2 the self_id packets of the two left-most children of the root node of cluster 1—which will receive the physical identifiers 0 and 1, before beginning to grant the bus to its own children, which will receive the subsequent physical identifiers 2, 3 and 4. After determining that all its children have sent their self_id packets, wbox2 attributes to itself the following physical identifier, being the root on its bus. It thus receives the physical identifier 5. Wbox2 then proceeds with forwarding, in the correct order considering the topology and the self identification process rules, the self identification packets of wbox1, followed by those of the two nodes between wbox1 and the root node of cluster 1, and lastly the self_id packet of the root node of cluster 1 itself, which receives the highest physical identifier, i.e. 9. Wbox2 thus simulates the sending of self_id packets on cluster 2, as if it were directly connected to cluster 1.

The process on cluster 1 is similar. When Wbox1 is granted the bus by the root node of cluster 1, it acts as if all nodes on cluster 2 were its children and accordingly forwards the self_id packets previously received from wbox2, according to the topology of cluster 2 as deduced from those same self_id packets.

This process works also when wbox1 is root node on cluster 1.

According to the present embodiment, once a bus has been reset, the wireless box sends a corresponding acknowledgment to its peer wireless box. The acknowledgment message may contain the same information as the bus-reset message, but may also be a simpler acknowledgement.

FIG. 4 shows the self_ids of the nodes of FIG. 3 after the reset procedure.

Once the self_id process is finished, the direction of clock transmission in the network is defined.

III] Bus Reset Transmission on an Existing Network (a) Reset Procedure of a Two-bus Network Every bus reset detected by a wireless box on its local bus is transmitted to its peer wireless box.

Moreover, according to the present embodiment, the receiving wireless box acknowledges the bus-reset message, once the reset has been carried out. This acknowledgment, which is the same as that mentioned previously, is normally not carried out over a wired medium, but may be necessary for a wireless medium, which is not as reliable.

When sending a bus reset message to its peer wireless box, a wireless box handles asynchronous data received from its peer wireless box as follows:

All asynchronous data received by a wireless box over the wireless link after sending of the bus reset message to its peer wireless box and before reception of an acknowledgment of receipt from this peer wireless box is discarded.

In other words, all asynchronous data sent by the peer wireless box and previously received on its local bus before it has processed the reset is discarded.

Nevertheless, packets from one wireless box to its peer wireless box other than those concerning retransmission from one bus to the other are still transmitted.

With reference to FIG. 4, we suppose that a reset is generated on cluster 1. The root node of cluster 1 then carries out the self-identification process. Wbox1 received the self_id packets of cluster 2 during a previous reset procedure, and uses these when given the bus grant, in a manner similar to what has already been described.

Once the bus reset has been performed on cluster 1, wbox1 sends a bus reset message to its peer wireless box. WBox2 then performs a bus reset on cluster 2, in a manner similar to what has already been described, using the self_id packets just received from wbox1.

Once the self_id process on cluster 2 has been performed, Wbox2 sends an acknowledgment to wbox1. From that moment on, wbox1 accepts again asynchronous data from wbox2 ('user data traffic').

If wbox2 received a reset on its local bus before sending the acknowledgment, indicating a change of topology of cluster 2, then wbox2 in turn generates a bus reset message incorporating the new self_id packets and sends it to wbox1, in order to update the view which nodes of cluster 1 have of cluster 2.

Figure 5:
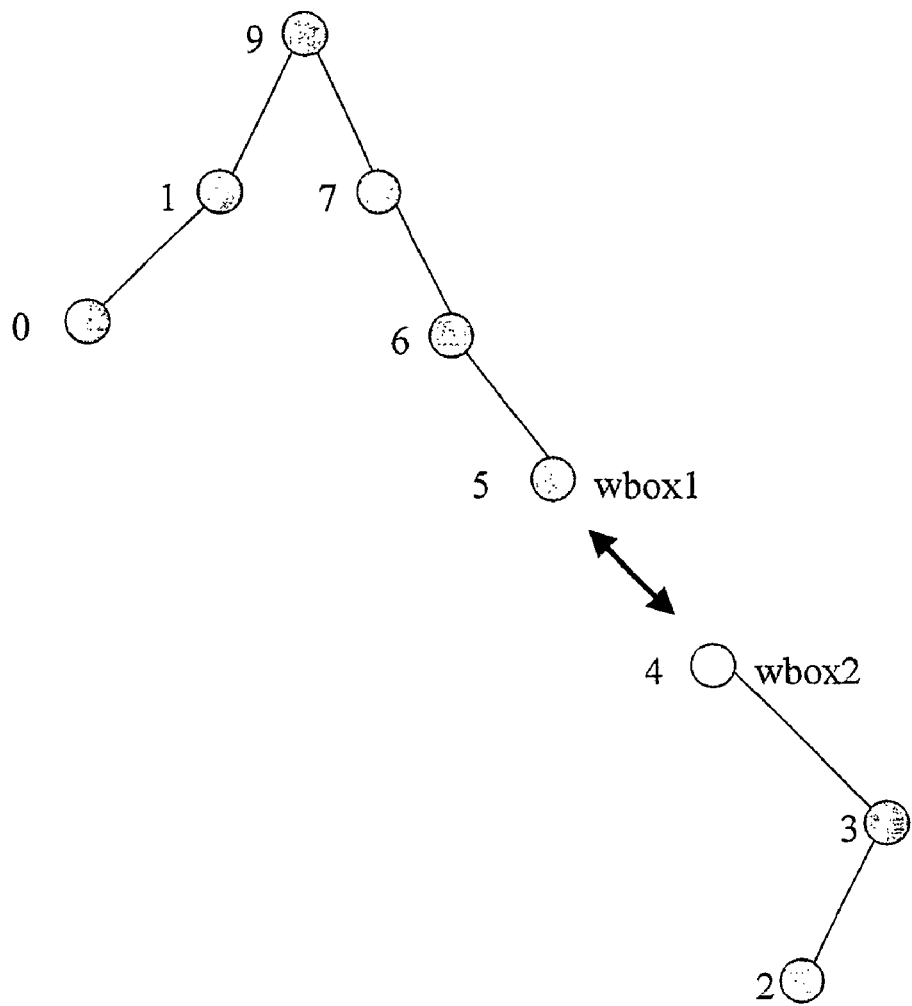
FIG. 5 represents the physical identifiers of the network of FIG. 4, after a reset due to removal of a device from one cluster.

FIGS. 4 and 5 illustrate a same network before and after a reset procedure. It is supposed that a reset is generated by the removal of the node having the physical identifier 4 on FIG. 4.

(b) Reset Procedure Over a Network with More than Two Busses.

Figure 6:
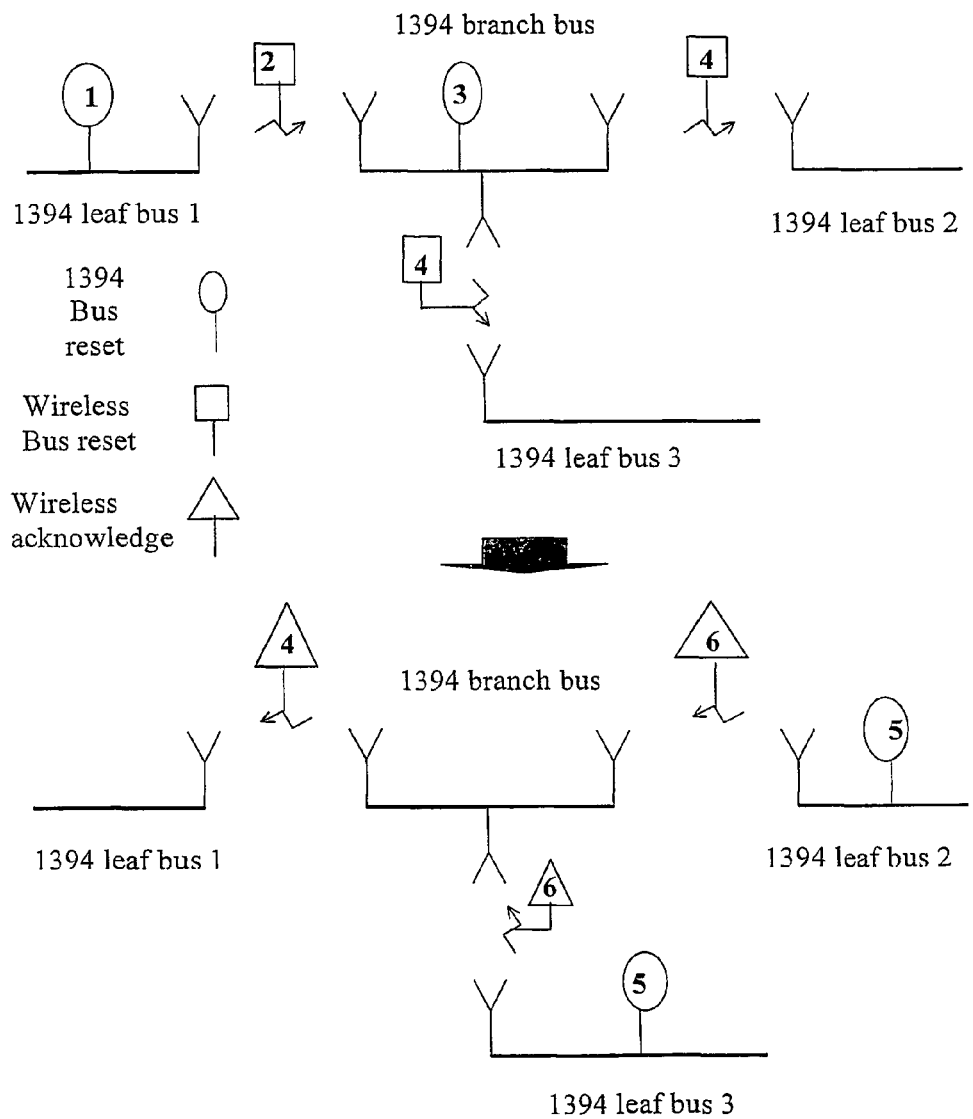
FIG. 6 represents a bus reset propagation sequence in a network when the reset is triggered by a leaf bus.

When a reset occurs on a leaf bus, the leaf bus forwards the reset to the branch bus, which in turn forwards it to each of the other leaf busses. The chronology of the process is illustrated by FIG. 6.

More precisely, when a bus reset occurs on a leaf bus, a reset is first performed on the leaf bus, followed by the wireless box of the leaf bus sending a bus reset message to its peer, located on the branch bus. The reset on the branch bus is then performed, and an acknowledgment of receipt sent to the initiating wireless box of the leaf bus. The wireless boxes of the branch bus then forward a bus reset message to the remaining leaf busses. Once these resets are carried out, corresponding acknowledgment messages are sent to the branch bus.

Figure 7:
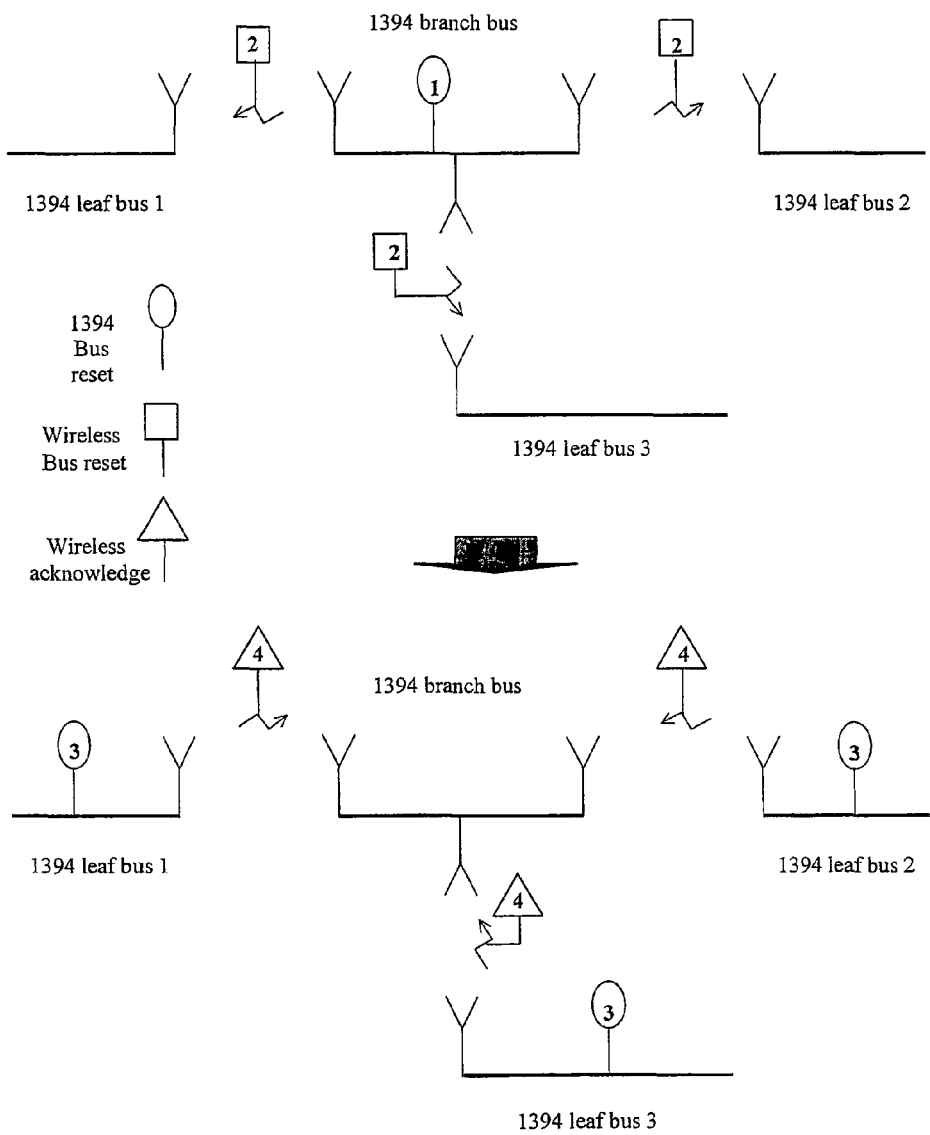
FIG. 7 represents a bus reset propagation sequence in a network when the reset is triggered by a branch bus.

When a reset occurs on a branch bus, the reset is forwarded to all leaf busses. The chronology of the process is illustrated by FIG. 7. A bus reset message is forwarded by each wireless box of the branch bus to the respective peer wireless box of the leaf busses. A reset is then performed on these busses, and an acknowledgment sent back to the wireless boxes of the branch busses.

As before, wireless boxes receiving a bus reset message acknowledge this message to their peer wireless boxes once the reset has been performed on their local bus.

Document (b) defines a maximum delay for a bus reset procedure. This timeout delay should be respected, according to the present embodiment.

IV] Isochronous Transmission

In a first step, the clock transmission on the network of busses will be discussed. In a second step, the reservation of isochronous resources on the network will be described.

(a) Isochronous Cycle Master

According to the prior art, on an IEEE 1394 bus, a node acts as a local cycle master, as defined by document (a). The role of a cycle master is to transmit the periodical cycle start packet, which is sent every 125 μs and on which all other nodes of a bus synchronize to access the bus. For environments in which several busses are linked by bridges such as those defined by documents (f) and (g), a mechanism has been defined at the level of each bus to permit propagation of a clock through the network of bridges and busses. An example of such a mechanism is the 'clock adjustment' mechanism defined at section 6.2. 'Cycle master adjustment packet' of document (f). According to this mechanism, the cycle master of a wired bus may be adjusted by any node of the wired bus using a 'clock adjustment' message. The adjusting node may in particular be a portal node which receives clock information from its peer portal node connected to another wired bus. Thus, a portal node need not necessarily be the cycle master of its bus in order for a clock to be propagated from a single master clock through a multi-bus network.

The adjustment mechanism is used only on wired busses. Bridges, be it wireless bridges or other types of bridges, have their own methods for propagating the clock between their portals. For example, in case of an ETSI BRAN Hiperlan 2 bridge, the transmission of a clock over a wireless link can be made using the mechanism described at section 5.3 'Cycle Synchronization Service' in document (e). On their wired bus interface, portals will use the adjustment mechanism.

According to the present embodiment, each wired bus of the network comprises a cycle master according to document (a). In addition, one of the cycle masters is elected to be the network cycle master, also called 'global' cycle master, which will act as the cycle master of the network comprising all wired busses (clusters) and wireless links. The global cycle master is the cycle master of the cluster that contains the global root of the network. The global cycle master's clock is used to synchronize the other cycle masters, and its location defines—apart in the special case seen below—the direction of the transmission path of the clock between wireless boxes.

A wireless box on a wired bus checks whether its bus contains the global cycle master by checking whether the global root is on the local cluster. If this is the case, the wireless box transmits clock synchronization information to its peer wireless box using, in the case of the present embodiment, the cycle synchronization service defined in document (e). The transmitting wireless box adequately configures its peer wireless box. The wireless box receiving clock information from its peer then proceeds to adjust the cycle masters of its local bus, if it is not itself the cycle master on its bus. When a wireless box receiving the clock from its peer box is at the same time cycle master, it still sends adjustment packets (which are broadcast packets) in order to conform to the procedure of the next paragraph.

Wireless boxes also listen to clock adjustment packets sent by other nodes on their local wired bus. Clock adjustment packets are broadcast packets, i.e. not addressed to a specific node on a bus. If a wireless box detects such a packet on its bus, it knows that the cycle master of its bus is being adjusted. In this case, it will become a sender of clock synchronization information to its peer wireless box. Note that the clock synchronization information is derived by the wireless box from the adjusted local cycle master's cycle start, not from the clock adjustment packet used to adjust this cycle master.

The clock coming from the global cycle master is thus propagated through the entire network ('network' being taken here as the group of busses linked according to the present embodiment so as to simulate a single bus).

Concerning the behavior of the global cycle master, the process is different when a Hiperlan 2 bridge as defined in document (g) is connected to one of the wired busses and transmits clock adjustment packets on this bus, which does not necessarily contain the global cycle master. In this case, a mechanism is provided to transmit the clock information from the Hiperlan 2 bridge to the global cycle master, which is not directly adjusted by the bridge's portal, but by a wireless box of the global cycle master's local bus. The direction of transmission of clock information is different, and does not always radiate from the global cycle master.

Figure 8:
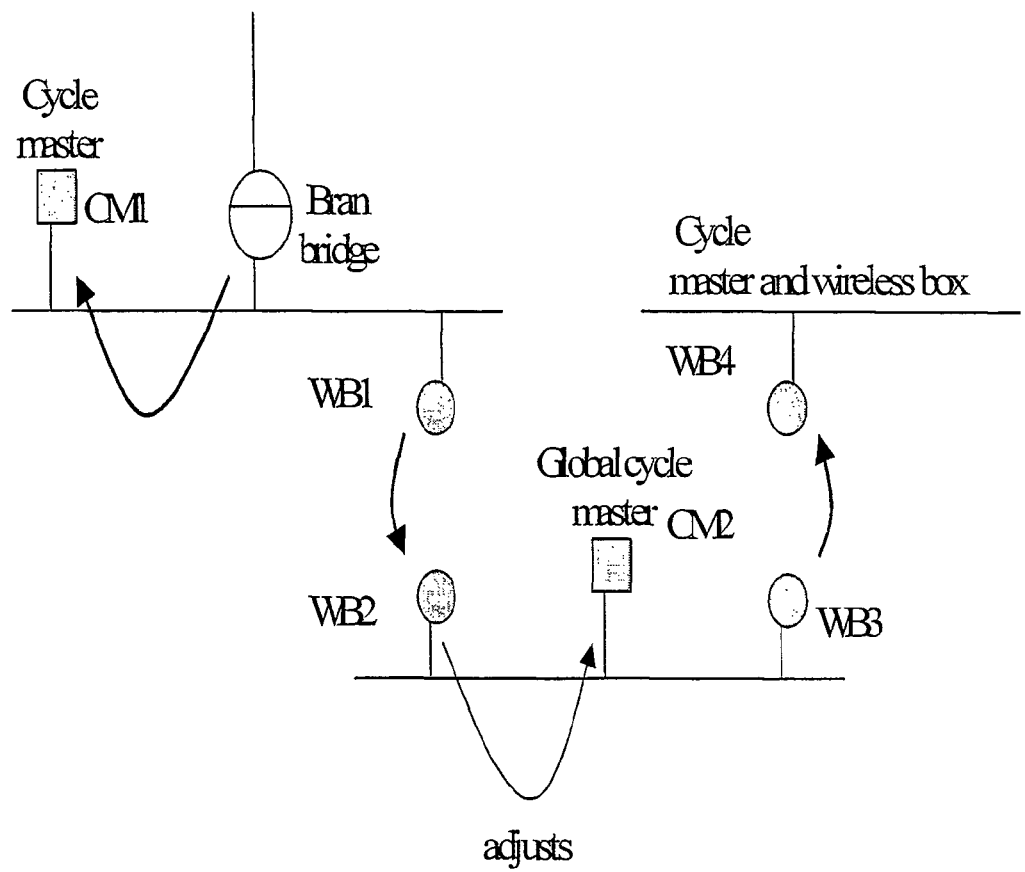
FIG. 8 is a diagram of a network illustrating the adjustment of cycle masters by a BRAN bridge.

FIG. 8 illustrates such a case. The arrows indicate the direction of propagation of clock information. The Hiperlan 2 bridge adjusts the cycle master CM1 of its local bus. The wireless box WB1 detects the clock adjustment packets broadcast by the bridge's portal, and uses the IEEE 1394 service specific convergence layer to transmit clock synchronization information derived from CM1's cycle start to wireless box WB2. This wireless box adjusts the global cycle master's (CM2) clock. WB3 detects the adjustment packets and derives its clock synchronization information from the global cycle master's cycle start. WB3 synchronizes WB4, which is cycle master on its own bus, and does not send any adjustment packets.

Determination in which direction a pair of wireless boxes passes clock information is determined before association. Each wireless box determines whether it receives clock adjustment packets on its local bus. The one wireless box which does receive such packets will be the clock synchronization sender, the other the clock synchronization receiver. If no adjustment packet is detected, the clock synchronization information will be sent from the bus containing the global cycle master.

Thus, in the case where the global cycle master detects clock adjustment packets being broadcast on its local bus, it acts as a normal cycle master: the global cycle master relinquishes its prerogatives to the Hiperlan 2 bridge.

When a cluster is connected to a branch bus, it is the receiver of the clock. If the new cluster contains a bridge, the direction of clock propagation is reversed.

According to the present embodiment, when a leaf bus that was the sender of the clock is disconnected from the network, then the branch bus' cycle master becomes the sender of the clock.

(b) Isochronous Resource Reservation

The isochronous resource manager (or 'IRM' as defined by document (a)) can be located in any IRM capable node.

When a talker node and a listener node of a IEEE 1394 connection are located on two different clusters linked through a wireless network as previously described, wireless isochronous resources need to be reserved for this connection.

The following assumptions are made:
The isochronous management follows the recommendation in document (c).
The IEEE 1394 node controlling the connection ('1394 controller' in what follows) between the talker node and the listener node cannot be distributed over two nodes. It is located on a single node. Therefore a controller can't be located on both sides of the wireless link. The 1394 controller's task is to issue the lock requests to the different talking or listening nodes.

When a wireless box receives a lock request on an input or output plug control register (i/oPCR) from a controller to a node on the other side of the wireless link, it keeps a copy of the request and sends the request to its peer.

When a wireless box receives a lock response in an i/oPCR from its peer box, it checks whether it has a copy of a request with the same channel number and if yes, whether the lock succeeded.

If the lock failed, no action is performed by the wireless boxes.

If the lock succeeded, the wireless boxes may perform actions, which are going to be described now.

The wireless boxes have to check whether the listener node and the talker node are on the same side of the wireless link or on different sides. In case both are one the same side, no reservation of wireless isochronous resources is required. In case the nodes are on different sides, such a reservation is required.

When it is necessary, the wireless box opens a wireless connection as defined by document (e). If there is enough bandwidth available, all the required bandwidth is reserved.

If there is not enough bandwidth, a connection with a limited bandwidth is reserved. The wireless box won't be able to send all the user packets over this connection. It will send only a part of them, corresponding to the allocated bandwidth.

According to the present embodiment, only two isochronous wireless channels may be reserved over a wireless link. If both isochronous wireless channels are already reserved, no reservation can be performed. The talker and the listener are not made aware of it, and their connection remains pending. The listener won't receive any data.

Of course, in another implementation, the maximum number of isochronous wireless channels may be different, or even unlimited.

When a channel and/or bandwidth is released, wireless boxes may reallocate the channel and/or bandwidth for one of the reserved and pending connections.

According to what has been mentioned above, the wireless boxes process both lock requests and lock responses. According to a preferred embodiment, only lock responses need to be processed, since they implicitly contain the corresponding lock requests.

In order to manage talker/listener connections at the level of the wireless boxes, the latter implement a specific register. Table 4 gives the contents of the register implemented in the wireless boxes for each connection requiring reservation of wireless isochronous resources which is set up over the wireless link. This register is called the wireless plug control register, or 'wPCR'. One such register is implemented for each connection.

Content of the wPCR register is similar to that of an oPCR register as defined in document (c), but it contains an additional field called 'Direction', which indicates whether the talker of the connection is located on the wireless box cluster, or on the side of its peer wireless box. It thus also defines the direction of the data transmission over the wireless link.

TABLE 4

| Broadcast connection counter | Point to point connection counter | Direction | Channel number | Data rate | Overhead ID | Payload |
|---|---|---|---|---|---|---|
| 1 | 6 | 2 | 6 | 2 | 4 | 10 |

Table 5 gives the values of the 'direction' field in the 'wPCR' register

TABLE 5

| Direction | Comments |
|---|---|
| $00_b$ | No talker |
| $01_b$ | Talker is located on the cluster of the Wbox |
| $10_b$ | Talker is located on the peer cluster |
| $11_b$ | Reserved |

The 'point to point connection counter' is set to one when a wireless connection is established between the talker and the listener. This field is incremented each time the connection is overlaid with a new listener which is not on the same cluster as the talker. The field is decremented each time a connection is released.

Both wireless boxes of a pair maintain a list of connections (in the sense of Hiperlan 2) which are active on the wireless link. An entry into the list is composed of the talker node identifier and a pointer to the corresponding wireless PCR register.

1. Case of a Non Overlaid Connection

By 'non-overlaid', it is meant that no wireless link exists for the isochronous channel which has been reserved by the 1394 controller.

Figure 9A:
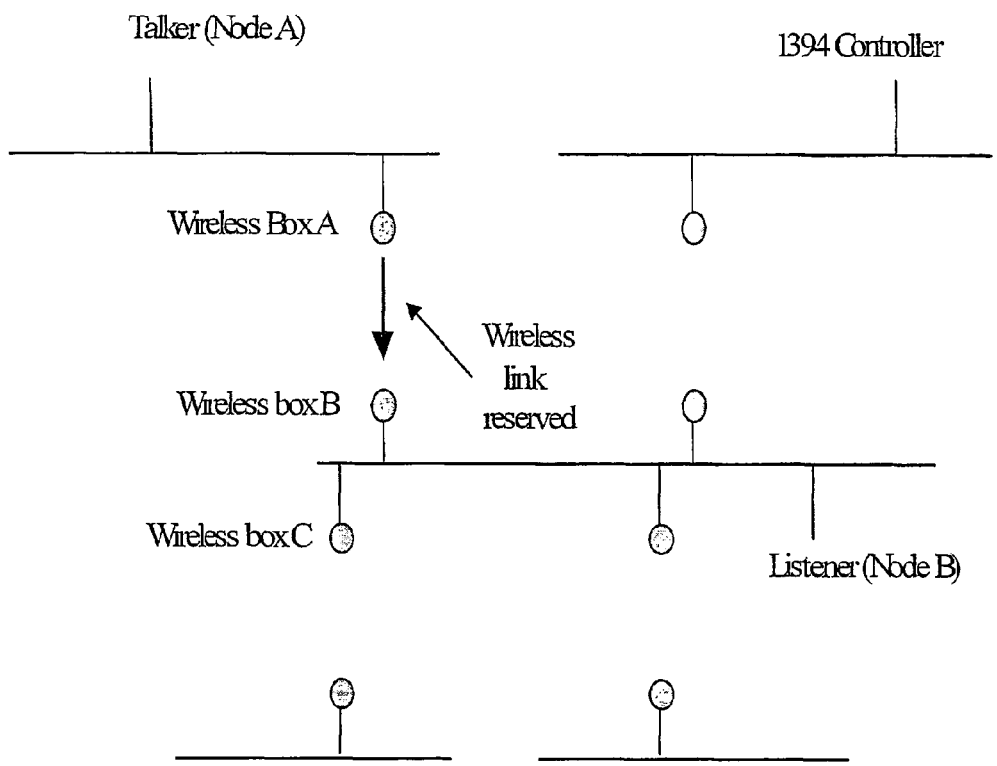
FIG. 9a is a diagram of a network illustrating resource reservation for an isochronous transmission in case of a non-overlaid connection.

FIG. 9a is a diagram of a network comprising several wired busses. Node A is the talker node, while node B is the listener node. Wireless box A is connected to the bus of node A, while wireless box B is connected to the bus of node B. In the present case, only one wireless connection needs to be reserved. Wireless box C is connected to the same bus as wireless box B, but is not on the path between the listener and the talker nodes. The 1394 controller can be on any of the busses.

As a first step in the establishment of a point to point connection as defined in IEC61883 (document(c)), talker node A and a listener node B are set by the 1394 controller mentioned earlier, through appropriate lock request messages. The 1394 controller performs a lock request on the input Plug Control Register (iPCR) of the listener node and a lock request on the output Plug Control Register (oPCR) of the talker node. Since these messages are transmitted to all busses, wireless boxes A, B and C (as well as all other wireless boxes) receive these requests and store their parameters, in particular the IEEE 1394 isochronous channel number. Talker node A and listener node B both send responses to the respective lock request. These responses are analyzed by the wireless boxes.

When a wireless box receives an iPCR lock response from the listener node through its peer wireless box, it deduces that the listener node is on the side of its peer wireless box. It will thus only need to make a reservation if it finds that the talker node is on its own side.

The wireless box is certain that the talker is not on its side of the network if it also receives the oPCR with the same channel number from its peer box. In this case, no reservation of wireless resources is made.

The wireless box is certain that the talker is on its side of the bus when it detects an oPCR register in any node, the oPCR register bearing the same channel number.

To determine this last condition, the wireless box carries out a process which consists in reading oPCR registers of nodes on its side of the network, both on the local cluster and remote clusters, looking for the appropriate channel number.

If the talker node corresponding to the iPCR lock response is found on its side of the wireless link, then the wireless box makes the necessary isochronous resource reservations. The wireless box also maintains a point to point connection counter, similar to the counter in the iPCR and oPCR registers, as defined in document (c) and sets this point to point connection counter to '1'.

When a wireless box receives an oPCR lock response from the talker node through its peer wireless box, it deduces that the talker node is on the side of its peer wireless box. It will thus only need to make a reservation if it finds that the listener node is on its own side.

The wireless box is certain that the listener node is not on its side of the network if it also receives the iPCR with the same channel number from its peer box. In this case, no reservation of wireless resources is made.

The wireless box is certain that the listener node is on its side of the bus when it detects an iPCR register in any node on its side of the network, the iPCR register bearing the same channel number as that in the oPCR.

To determine this last condition, the wireless box carries out a process which consists in reading iPCR registers of nodes on its side of the network, looking for the appropriate channel number.

If the listener node corresponding to the oPCR lock response is found on its side of the wireless link, then the wireless box makes the necessary isochronous resource reservations, and sets its point to point connection counter and that of its peer wireless box to '1'.

In the case of FIG. 9a, wireless box B receives an oPCR lock response through wireless box A from talker node A. It will also receive an iPCR lock response on its local bus from listener node B.

In each case, only one wireless box of a link is triggered to make the isochronous resource reservation over the link.

2. Case of an Overlaid Connection

Overlaying a connection onto an existing connection consists in adding a listener to the existing connection.

During the overlaying of a connection, the oPCR register of the talker node and the iPCR register of the new listener node are modified: the point to point connection counters are incremented in each register, and the isochronous channel number is copied from the oPCR into the iPCR of the new listener. If the listener and the talker are on different clusters, the lock request is sent, as for the initial point to point connection, across the wireless link.

The overlaid listener may be one of the existing listeners.

When a wireless box receives a lock request in an o/iPCR and when a corresponding connection already exists over the wireless link, the point to point connection counter of the o/iPCR is incremented, and the point to point connection counter of the wPCR register is also incremented.

If a new connection is required, the same rules as before apply.

Figure 9B:
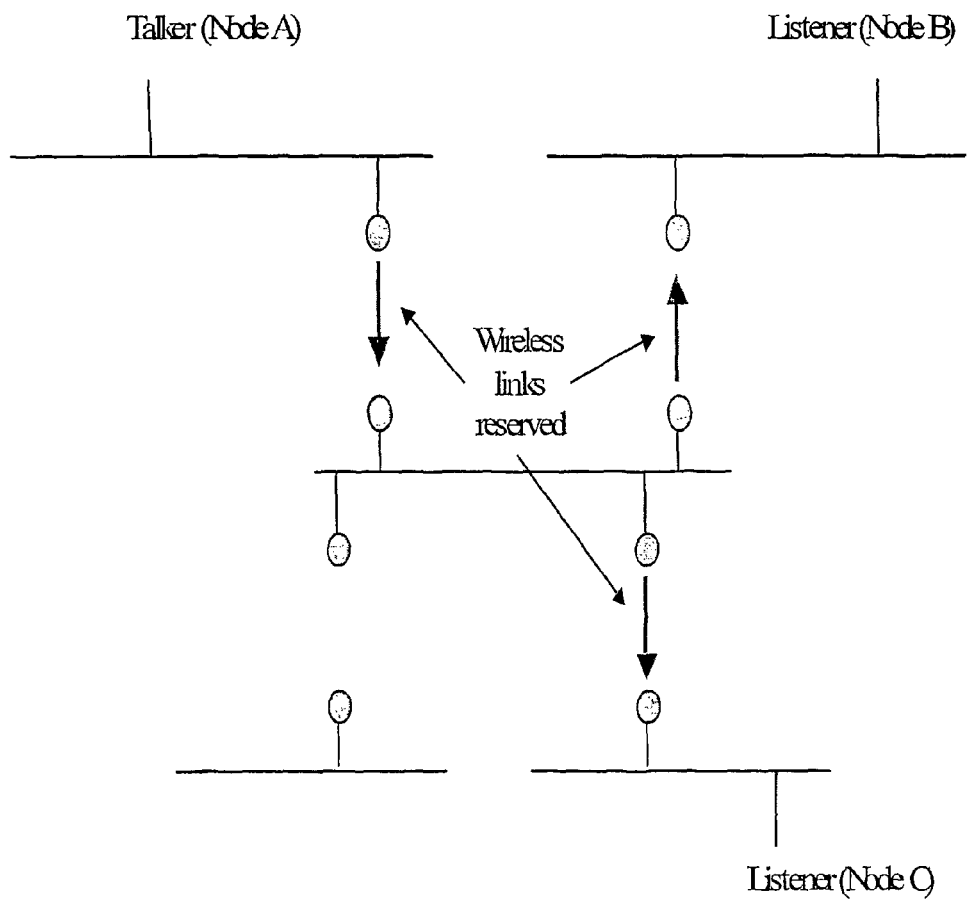
FIG. 9b is a diagram of a network illustrating resource reservation for an isochronous transmission in case of an overlaid connection.

FIG. 9b illustrates the wireless connections requiring reservation for a particular configuration of a network in case of an overlaid connection. An isochronous channel has been set up between devices A and B. To overlay a connection between A and C, one additional connection is required in addition to the two which already exist.

3. Breaking a Connection

When a wireless box receives a lock response from its peer for the oPCR of the talker node and the talker is unconnected, this being detected by checking whether the point to point connection counter of the corresponding wPCR register is 0, a wireless connection is no longer necessary, and the corresponding resources can be deallocated by the wireless box by sending an appropriate message to its access point.

When a wireless box receives a lock response from its peer for the iPCR of a listener and when the point to point connection counter of the wPCR is set to 0, this means that no listener remains in the peer cluster. A wireless connection is no longer necessary. and resources can be deallocated.

4. Modification of the Bandwidth

A wireless box periodically reads the bandwidth written in the oPCR register of the talker nodes for which is has listed an active connection and which are on its cluster. If the bandwidth has been modified compared to resources requested on the wireless link, the wireless box modifies the bandwidth reservation on the wireless link.

It also updates the wireless boxes located along the connection, i.e. when the bandwidth of a wPCR is updated, the bandwidth of the corresponding wireless connections is updated, through appropriate commands.

Indeed, since the wireless link is transparent to 1394 nodes, these cannot request a change of bandwidth on their own. Any change has therefore to be detected by the wireless boxes, through a procedure such as above.

According to a variant embodiment, each wireless box periodically polls the output plug registers of talker nodes on its own side of the network and for which it participates in the connection, and does not limit this polling to talker nodes on its local wired bus. If the bandwidth indicated in one of the output plug registers of these talker nodes differs from the bandwidth reserved on the wireless link, the wireless box attempts to modify the reserved wireless bandwidth value correspondingly.

Figure 10:
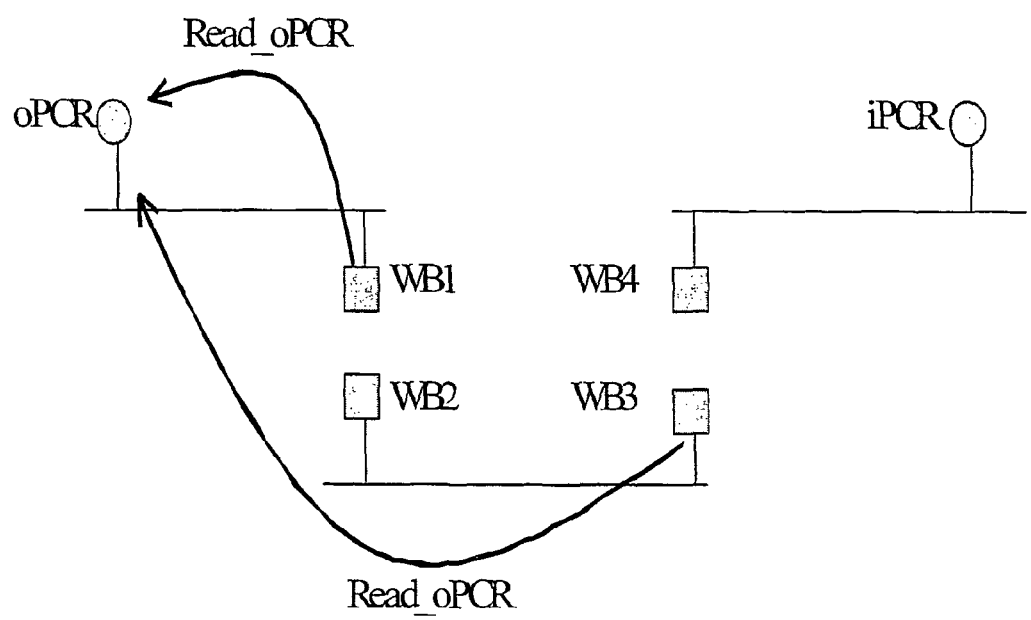
FIG. 10 is a diagram of a network illustrating the modification of a wireless bandwidth reservation by bridges on the path between a talker node and a listener node according to a variant embodiment of the invention.

FIG. 10 gives an illustration of the process. Although the illustrated connection links one talker node (identified by its output plug register oPCR) to one listener node (identified by its input plug register iPCR), the connection may comprise additional listener nodes. The talker node and the listener node are located on different leaf busses, both leaf busses being connected to a central branch bus.

Two wireless devices, WB1 and WB3, list the talker node as being on their side of the network. They consequently periodically query the talker node's output plug register. Note that the query message from WB3 crosses the bridge formed by WB1 and WB2. Each wireless box then updates resource reservations only for its respective bridge, if necessary.

V] Broadcast-out and Broadcast-in Connections

1. Introduction

A broadcast-out connection is a connection of a talker node to a broadcast channel, while a broadcast-in connection is a connection of a listener node to a broadcast channel.

An application establishing a broadcast-out connection does in general not know whether the output plug will continue to transmit an isochronous data flow or not.

An application establishing a broadcast-in connection does in general not know whether there is an output plug transmitting an isochronous data flow over the broadcast channel defined in the broadcast connection, and whether, if such an output plug exists, this output plug will continue transmitting or not.

2. Creating a Connection

Wireless boxes monitor the network to detect whether bridges are to take part in broadcast connections. Each wireless box reads, for example periodically, the output plug registers of nodes on its side of the network and tests the broadcast connection counters of these registers. If a broadcast connection counter is set, the wireless box forwards the corresponding node identifier and channel number to its peer wireless box, which polls the input plug registers of nodes on its own side to detect the existence of a broadcast-in connection having same channel number. If such a broadcast-in connection is detected, an isochronous channel is opened over the wireless link, for example by the wireless box on the side of the broadcast-in node. A wireless PCR is created for the broadcast connection, according to the rules already described.

3. Releasing a Connection

For a broadcast connection for which the talker node is on its side of the network, a wireless box regularly checks whether the broadcast out connection is still active by polling the corresponding output plug register of the talker node and testing the broadcast connection counter. If this flag is not set anymore, then the reserved wireless resources are released.

Similarly, a wireless box located on the broadcast-in side of the network regularly reads the iPCR of the listener node to check whether the broadcast-in connection is still active. When this is not the case, the iPCRs of all other nodes located on that side of the network are checked for the channel number corresponding to the broadcast connection. If none is found, the reserved wireless isochronous resources are released.

It may happen that a channel which is already used for a broadcast connection is nevertheless attributed to an isochronous connection. The use as an isochronous channel has priority over the use as a broadcast channel. The wireless boxes do not check the status of the broadcast counters in the oPCR and the iPCRs as long as the channel is used for an isochronous connection, but this checking is resumed once the channel is released.

In a general manner, after a bus reset, it is required to verify whether nodes which are part of a connection are still present. Consequently, after a bus reset, the wireless boxes try to read PCRs which were allocated to connections before the reset to check whether they are still allocated. It they are not, the corresponding channel reservations are cancelled.

The invention claimed is:

1. Method for linking a first and a second communication bus through a wireless link, comprising a first portal connected to the first bus and a second portal connected to the second bus, said first and second portal communicating over a wireless connection, said method comprising the steps of: associating the two portals to the wireless network, wherein after association of the two portals, forcing at least one of the two portals to be the root node on its local bus; exchanging, between the two portals of self identification packets of nodes connected to their respective local busses, including the self identification packets of the portals themselves; —generating a reset on each bus; carrying out a self identification procedure on each bus, where each portal generates self identification packets for itself and for nodes of the respective remote bus, using the self identification packets received following the association step; and —having each portal determine, prior to exchanging self identification packets, whether the network topology which would result from linking the two busses would be valid or not, and in the negative, to abort the linking process.

2. Method according to claim 1, further comprising steps for a portal to:
   identify the type of its local bus prior to association with its peer portal, wherein the bus may be of the branch type, the leaf type or the non-linked type;
   determine whether there exists a branch bus in the network formed by the linked busses.

3. Method according to claim 2, wherein the local bus type and branch existence determined by a portal are stored in a register accessible by other nodes.

4. Method according to claim 3, wherein the steps of identifying the bus type and determining a branch existence are carried out by a portal by determining other portals connected to its local bus, reading and analyzing the content of the registers of these other portals and determining whether these other portals are part of an active link or not.

5. Method according to claim 4, wherein:
   (a) when a portal finds that there is no portal part of an active link on its local bus, labeling the local bus as a non-linked bus;
   (b) when a portal finds that there is a single portal part of an active link on its local bus, labeling the local bus as a leaf bus;
   (c) when a portal finds a plurality of portals part of an active link on its local bus, labeling the local bus as a branch bus.

6. Method according to claim 5, wherein a portal determines that in case (a) there is no branch bus, that in case (b), whether there is a branch bus or not is given by the register of one of the portals part of an active link on the local bus and that in case (c), there is a branch bus.

7. Method according to claim 1, wherein in the case a third bus is to be linked to a branch bus through a wireless connection formed by a third portal connected to the third bus and a fourth portal connected to the branch bus, the following rules are used to determine which of the third and fourth portals is to be a root node: if the fourth portal connected to the branch bus is already a root node, the third portal connected to the third bus is not to try to become a root node; else it is to try to become a root node.

8. Method according to claim 1, wherein the linking process is aborted if none of the two portals to form a wireless connection are a root node on their local bus.

9. Method for carrying out a reset of a network comprising at least two busses linked according to the method of claim 1, comprising the steps of:

carrying out a reset and self-identification procedure on the bus on which a reset generating event took place, where each portal part of an active link and connected to the reset originating bus emits self-identification packets for remote nodes stored during a previous reset;

having each portal part of an active link transmit a reset message to its peer portal for triggering a reset on the local bus of the peer portal, where the reset message comprises self-identification packets collected during the reset on the reset originating bus.

10. Method according to claim 9, wherein a portal having received a reset message from its peer portal acknowledges the reset message after performance of the reset on its local bus.

11. Method according to claim 1, wherein the communication busses are IEEE 1394 busses and the wireless network is a HIPERLAN 2 network.

12. Method for propagating a clock in a communication network comprising a plurality of busses, linked looplessly through wireless links wherein each wireless link comprises two portals, said network implementing the method of claim 1, comprising the steps of:

determining a cycle master node on each bus, wherein the cycle master node of a given bus is adapted to send clock signals to other nodes of the given bus;

electing a global cycle master among all cycle masters previously determined;

having each portal determine whether the global cycle master is on the bus to which the portal is connected, and in the affirmative, instructing the peer portal of the same link to adjust the cycle master of the peer portal's local bus, based on clock information provided by the portal of the global cycle master's bus.

13. Method according to claim 12, further comprising the step of having each portal determine whether cycle master clock adjustment messages are being sent on its local bus, and in the affirmative, instructing the peer portal of the same link to adjust the cycle master of the peer portal's local bus, based on clock information provided by the portal derived from the clock signal of the cycle master of its local bus.

14. Method according to claim 12, further comprising the step of having a portal which is cycle master for its local bus and which receives clock information from its peer portal send cycle master clock adjustment packets on its local bus.

15. Method for reserving isochronous resources in a network implementing the method according to claim 1, wherein it comprises the steps of:

having a connection controller send lock requests respectively to a talker node output plug control register and to a listener node input plug control register, wherein said requests comprise a connection identifier;

having each portal store a received request in memory and transmit it to its peer portal;

upon reception of a successful lock message from its peer portal, have a portal determine whether the successful lock message concerns a stored request having same connection identifier, and in the affirmative, checking whether the listener and talker nodes are on different sides of the node, and when this is the case, making isochronous resource reservations on the wireless link.

16. Method according to claim 15, wherein the connection identifier is an isochronous channel number.

17. Method according to claim 15, wherein making the resource reservation comprises setting up a connection over the wireless link, a portal setting up a register for each connection, said register comprising at least one of the following:

the location of the talker node, compared to the portal setting up the connection, the isochronous channel number associated with the connection, a point to point connection counter.

18. Method according to claim 17, wherein the point to point connection counter is set to one when a non-overlaid connection is set up.

19. Method according to claim 18, wherein the point to point connection counter of an existing connection is incremented when a new connection is overlaid over the existing connection, and decremented when an existing connection is released.

20. Method according to claim 15, when a portal receives a successful lock message concerning an input plug control register, respectively an output plug control register, it does not make any isochronous resource reservation if it also receives from its peer portal a lock message concerning an output plug control register, respectively an input plug control register and having same connection identifier.

21. Method according to claim 15, wherein the step, for portal, of determining whether a listener node and a talker node are on the same side of the network compared to the portal, further to receiving from its peer portal a successful lock message on an input control register, respectively output plug control register, with a given connection identifier, of reading output plug control registers, respectively input plug control registers, of nodes on the portal's side of the network in order to detect a plug control register containing the given connection identifier.

22. Method according to claim 15, wherein reserving isochronous resources comprises the step of specifying a desired bandwidth for a connection over the wireless network.

23. Method according to claim 22, further including the step of having a portal check at predetermined intervals output plug control registers of talker nodes of active connections and of updating bandwidth reserved for corresponding connections as a function of bandwidth values read in said output plug control registers.

* * * * *